(12) United States Patent
Chen

(10) Patent No.: US 7,518,776 B2
(45) Date of Patent: Apr. 14, 2009

(54) PORTABLE ELECTRONIC DEVICE WITH MULTIFUNCTIONAL COATING

(75) Inventor: Ga-Lane Chen, Fremont, CA (US)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 279 days.

(21) Appl. No.: 11/397,989

(22) Filed: Apr. 4, 2006

(65) Prior Publication Data

US 2007/0086077 A1    Apr. 19, 2007

(30) Foreign Application Priority Data

Oct. 14, 2005    (CN)    ............... 2005 1 0100371.8

(51) Int. Cl.
*G02F 1/15*    (2006.01)
*G02F 1/153*    (2006.01)

(52) U.S. Cl. .................. 359/265; 359/267

(58) Field of Classification Search .............. 359/265
See application file for complete search history.

(56) References Cited

U.S. PATENT DOCUMENTS

2004/0253401 A1 *  12/2004  Pratt et al. ............. 428/35.7
2007/0139756 A1 *   6/2007  Agrawal et al. ......... 359/265

* cited by examiner

*Primary Examiner*—Jordan M. Schwartz
*Assistant Examiner*—James C Jones
(74) *Attorney, Agent, or Firm*—Andrew C. Cheng

(57) ABSTRACT

A portable electronic device, such as a notebook computer, includes a base and a lid. The base or the lid includes a shell and a multilayer structure coating thereon. The multilayer structure includes an electrically conductive layer, an electro chromic layer, an electrolyte layer, an ion storage layer and an electrode layer stacked one on another in that order. The portable electronic device utilizes the electro chromic layer to change colors, thereby the color-change function of the portable electronic device is achieved. Additionally, the electrode layer contains a photo catalyst $TiO_2$ that has deodorizing, antibacterial and self-cleaning functions.

16 Claims, 4 Drawing Sheets

PORTABLE ELECTRONIC DEVICE WITH MULTIFUNCTIONAL COATING

TECHNICAL FIELD

The present invention relates to portable electronic devices and, more particularly, to a portable electronic device with a multifunctional coating.

BACKGROUND

With the development of wireless communication and information processing technologies, portable electronic devices such as mobile telephones, mp3 players and electronic notebooks are now in widespread use. These electronic devices enable consumers to enjoy the convenience of high technology services, anytime and anywhere. In addition, many manufacturers at present make multifunctional portable electronic devices, such as mobile telephones incorporating cameras, thus creating even greater demand for even more flexible technologies.

Besides the functions, the appearances of the portable electronic devices are also important. A notebook with a pretty shape and an eye-catching color is more attractive to consumers than the traditional black/grey box-shaped design. At present, people can swap frames and thus change colors to fit their fancies. However, the colors of the frames generally cannot change themselves and consumers must change colors of the portable electronic devices, if they want, by changing the frames thereof. This is too awkward for most consumers and is also rather expensive.

People are now also beginning to focus more on healthy and hygienic products, so there is increasing demand for portable electronic devices that have deodorizing, antibacterial, self-cleaning functions, etc.

What is needed, therefore, is to provide an improved portable electronic device with a multifunctional coating.

SUMMARY

A portable electronic device according to one preferred embodiment includes a casing consisting of a shell and a multilayer structure coated thereon. The multilayer structure includes, from inside to outside, an electrically conductive layer, an electrochromic layer, an electrolyte layer, an ion-storage layer and an electrode layer.

Compared with conventional portable electronic devices, the present portable electronic device has following advantages. The electrochromic layer is able to change the color and the transmittance of the portable electronic device using different DC voltages (from −5 to +5 volt) transmitted through the electrically conductive layer, thus a portable electronic device with changeable color is formed.

Other advantages and novel features will become more apparent from the following detailed description of present multifunctional portable electronic device, when taken in conjunction with the accompanying drawings.

BRIEF DESCRIPTION OF THE DRAWINGS

Many aspects of the portable electronic device can be better understood with reference to the following drawings. The components in the drawings are not necessarily to scale, the emphasis instead being placed upon clearly illustrating the principles of the present portable electronic device. Moreover, in the drawings, like reference numerals designate corresponding parts throughout the several views.

DETAILED DESCRIPTION OF PREFERRED EMBODIMENTS

Reference will now be made to the drawings to describe preferred embodiment of the portable electronic device, in detail. The portable electronic devices include notebook computers, mobile phones, Personal Digital Assistants, mp3 players and so on.

Figure 1:
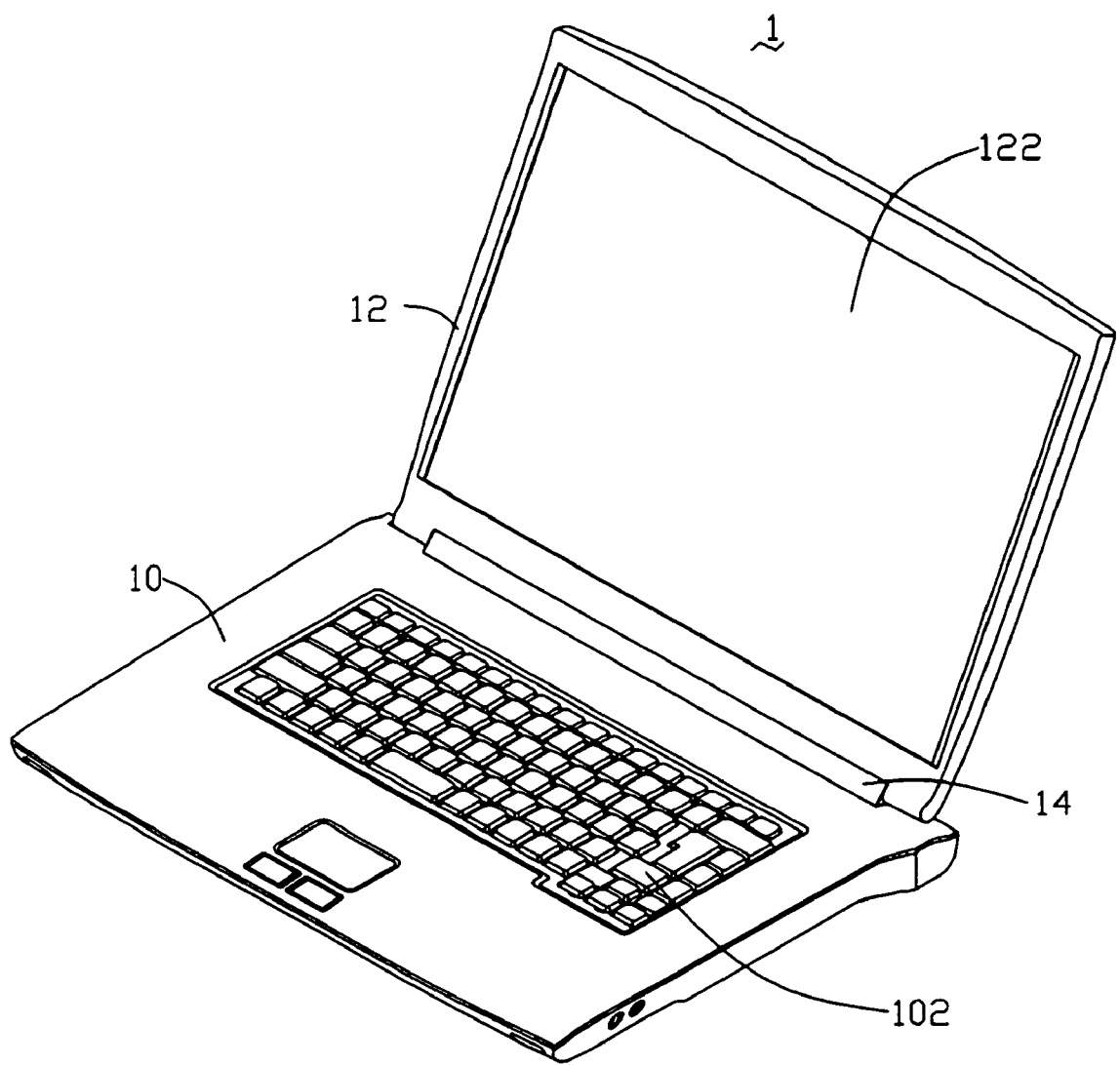
FIG. 1 is a schematic, isometric view of a portable electronic device in accordance with a preferred embodiment.

Referring to FIG. 1, a portable electronic device 1, in accordance with a preferred embodiment, is shown. This preferred embodiment takes a notebook computer as an example. The portable electronic device 1 includes a first casing 10 and a second casing 12. According to FIG. 1, the first casing 10 and the second casing 12 are respectively the base and the lid of the portable electronic device 1. The first casing 10 houses internally various integrated circuit chips and other circuitry to provide computing operations for the portable electronic device 1. The integrated circuit chips and other circuitry may include for example a microprocessor, Read-Only Memory (ROM), Random-Access Memory (RAM), a disk drive, a battery, and various input/output (I/O) support circuitry The first casing 10 also includes a keyboard 102 that allows a user of the portable electronic device 1 to enter data.

The second casing 12 is coupled to the first casing 10 by way of a hinge mechanism 14. As such, the second casing 12 can rotate into an open position or a closed position with respect to the first casing 10. As illustrated in FIG. 1, the second casing 12 is in the open position. The second casing 12 contains a liquid crystal display (LCD) panel 122. The LCD panel 122 is visible to a user of the portable electronic device 1 when the second casing 12 is in the open position, such as illustrated in FIG. 1.

Figure 2:
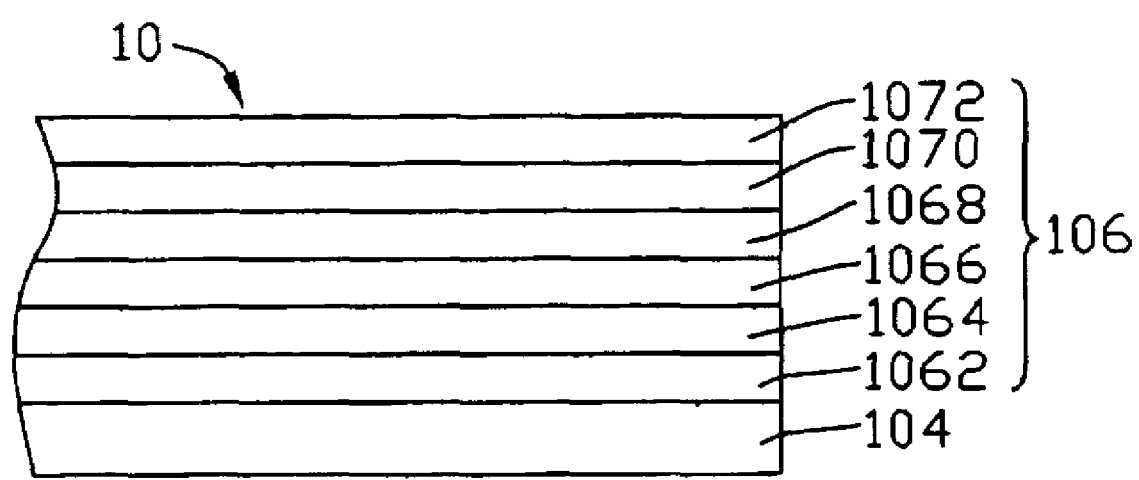
FIG. 2 is a schematic, cross-sectional view of a portion of a first casing of the portable electronic device of FIG. 1.

FIG. 2 illustrates a structure of the first casing 10 of the portable electronic device 1. The first casing 10 includes a shell 104 and a multilayer structure 106 coated thereon. A material of the shell 104 includes magnesium alloy. The density of magnesium alloy is lighter than Al alloy and thus helps to lighten the structure.

A multilayer structure 106 is coated on a surface of the shell 104, and includes an electrically conductive layer 1062, an electrochromic layer 1064, an electrolyte layer 1066, an ion storage layer 1068, an electrode layer 1070 and a fluorescent layer 1072 stacked one on another in that order.

The electrically conductive layer 1062 is mounted on the surface of the shell 104 and includes indium tin oxide for electrical conduction and also a separate heat dissipation material. The heat dissipation material is selected from the group consisting of silver, copper and gold according to this preferred embodiment due to their excellent heat dissipation effect. Generally, the heat dissipation material is in the form of particles having a grain size in the approximate range from 1 nm to 5 nm and the percent by weight thereof in the electrically conductive layer 1062 is roughly in the range from 1% to 5%.

The electrochromic layer 1064 is comprised of a material selected from the group consisting of Nano-NiO$_x$, Nano-WO$_3$, Nano-AgBr/TiO$_2$ and other electrochromic materials, wherein x is in the range from 0.5 to 2 and preferably is in the range from 0.8 to 1.2. The electrolyte layer 1066 may be formed of particles including Ta$_2$O$_5$ doped with hydrogen, the particles having a grain size in the approximate range from 10 nm to 100 nm. Alternatively, the electrolyte layer 1066 also could include LiTaO$_y$ particles, wherein y is in the range from 1 to 3 and preferably is in the range from 2.2 to 2.8. A material of the ion storage layer 1068 includes a composition of NbO$_z$ that can storage H$^+$, Li$^+$ and/or any other ions with positive charge, wherein z is in the range from 1 to 3 and preferably is in the range from 2.2 to 2.8.

Materials of the electrode layer 1070 include ITO and a photocatalyst that is comprised of nano-sized particles of TiO$_2$. The grain size of the particles of TiO$_2$ particles is in the approximate range from 10 nm to 20 nm and the percent by weight thereof in the electrode layer is roughly in the range from 1% to 20%. A thickness of the electrode layer 1070 is in the approximate range from 20 nm to 500 nm.

The fluorescent layer 1072 is the outmost layer of the first casing 10 and contains indium tin oxide and fluorescent particles. A material of the fluorescent particles is selected from the group consisting of ZnSiO$_m$:Eu, (Y, Gd)BO$_3$:Eu, and Ba:MgAlO$_n$:Eu. Wherein m is in the range from 0.5 to 3 and preferably is in the range from 1.5 to 2.5, and n is in the range from 1 to 2 and preferably is the range from 1.2 to 1.8. Generally, the percentage by weight of the fluorescent particles in the fluorescent layer 1072 is in the range from about 0.1% to 2%. The fluorescent layer 1072 makes the surface of the first casing 10 have an attractive fluorescent effect.

Figure 3:
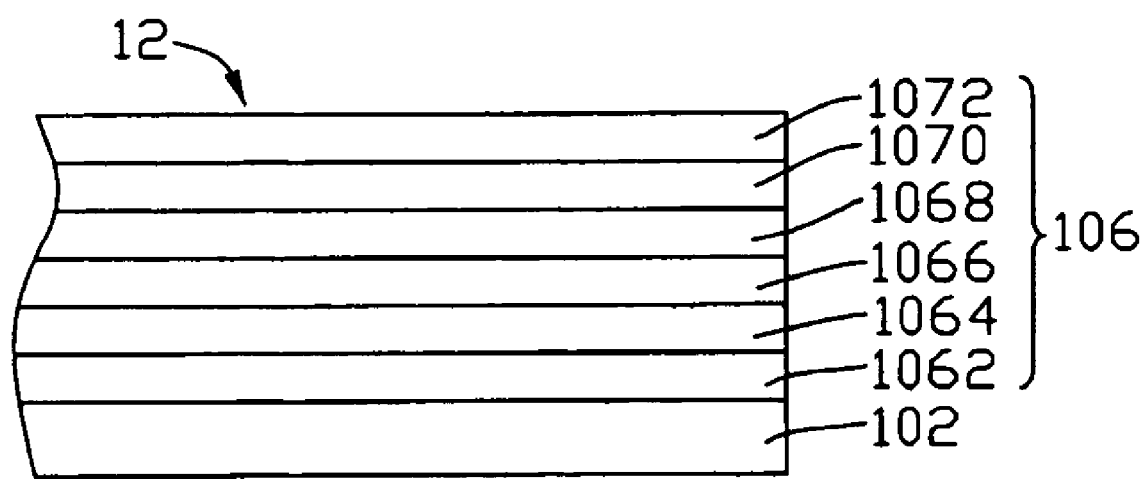
FIG. 3 is a schematic, cross-sectional view of a portion of a second casing of the portable electronic device of FIG. 1.

Referring to FIG. 3, a structure of the second casing 12 of the portable electronic device 1 is shown. The structure of the second casing 12 is similar to the structure of the first casing 10 as shown in FIG. 2, and the difference is that a material of the shell 102 of the second casing 12 may be fiberglass or a magnesium alloy.

Figure 4:
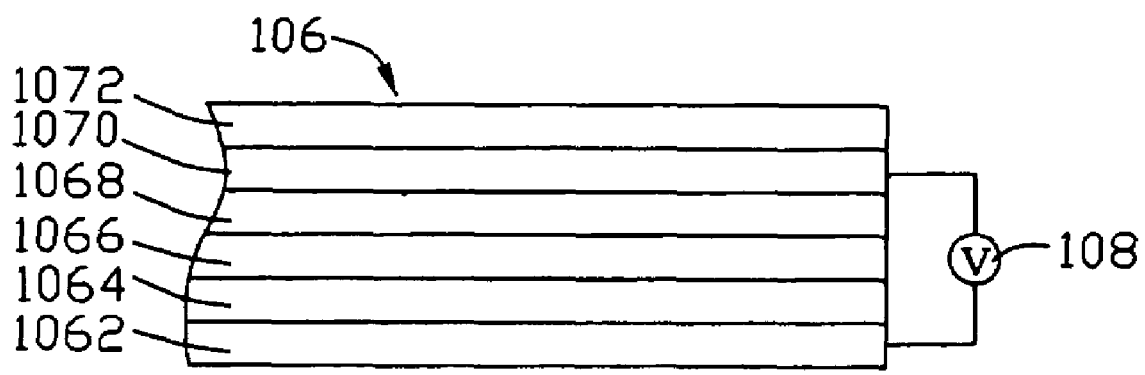
FIG. 4 is a schematic, cross-sectional view showing a multilayer structure of the first casing or the second casing in accordance with the preferred embodiment, together with a voltage-supplying device connected thereto.

According to this preferred embodiment, a voltage-supplying device 108, as shown in FIG. 4, could also be included in the portable electronic device 1. The electrically conductive layer 1062 and the electrode layer 1070 connect to opposing poles of the voltage-supplying device 108, wherein the positive pole thereof corresponds to the electrode layer 1070 and the negative pole corresponds to the electrically conductive layer 1062. The electrolyte layer 1066 conducts ions back and forth between the electrochromic layer 1064 and the ion storage layer 1068. To change colors, a voltage supplied by the voltage-supplying device 108 is applied across the electrode layer 1070 and the electrically conductive layer 1062. This causes positively charged ions to move from the ion storage layer 1068 into the electrochromic layer 1064, which thus changes to a darker color. Reversing the voltage drives these ions back into the ion storage layer 1068, causing the surface of the first casing 10 or the second casing 12 to lighten again. With different voltage, we can get different colors from the electrochromic layer 1064. For example, when supplying a voltage in the range from 1 volt to 2 volt between the electrically conductive layer 1062 and the electrode layer 1070, a navy blue color may be achieved. Generally, a voltage of the voltage-supplying device 108 supplies is roughly in the range from −5 volt to +5 volt.

Compared with conventional portable electronic devices, the present portable electronic device 1 has following advantages. The multilayer structure 106 means that the user may easily change colors of the first casing 10 or the second casing 12 according to his or her fancy due to the electrochromic layer 1064. Furthermore, the electrode layer 1070 contains a photocatalyst TiO$_2$ that has deodorizing, antibacterial, self-cleaning functions. Additionally, the outmost layer of the first casing 10 or the second casing 12 is a fluorescent layer and its fluorescent colors should be attractive to young and old alike.

It is to be understood that the above-described embodiment is intended to illustrate rather than limit the invention. Variations may be made to the embodiment without departing from the spirit of the invention as claimed. The above-described embodiments are intended to illustrate the scope of the invention and not restrict the scope of the invention.

What is claimed is:

1. A portable electronic device, comprising:
   a casing including a shell and a multilayer structure formed on the shell, wherein the multilayer structure comprises an electrically conductive layer, an electrochromic layer, an electrolyte layer, an ion storage layer and an electrode layer stacked one on another in that order, wherein a material of the electrolyte layer is selected from the ground consisting of Ta$_2$O$_5$doped with hydrogen and LiTaOy, wherein y is in the range from 1 to 3.

2. The portable electronic device as claimed in claim 1, wherein the portable electronic device Is selected from the group consisting of a notebook computer, a mobile phone, a personal digital assistant and a Moving Picture Experts Group Audio Layer 3 player.

3. The portable electronic device as claimed in claim 1, wherein a material of the shell is comprised of magnesium alloy.

4. The portable electronic device as claimed in claim 1, wherein the electrically conductive layer is comprised of a metal material selected from the group consisting of silver, copper, and gold.

5. The portable electronic device as claimed in claim 4, wherein the metal material of the electrically conductive layer is in a form of particles having a grain size in the approximate range from 1 nm to 5 nm.

6. The portable electronic device as claimed in claim 4, wherein the percent by weight of the metal material in the electrically conductive layer is in the approximate range from 1% to 50%.

7. The portable electronic device as claimed in claim 1, wherein the electrochromic layer is comprised of a material selected from the group consisting of nano-NiOx, nano-WO$_3$, and nano-AgBr/TiC$_2$, wherein x is in the range from 0.5 to 2.

8. The portable electronic device as claimed in claim 1, wherein the grain size of the material of the electrolyte layer is in the approximate range from 10 nm to 100 nm.

9. The portable electronic device as claimed in claim 1, wherein a material of the ion storage layer is comprised of NbOz, wherein z is in the range from 1 to 3.

10. A portable electronic device, comprising:
    a casing including a shell and a multilayer structure formed on the shell, wherein the multilayer structure comprises an electrically conductive layer, an electrochromic layer, an electrolyte layer, an ion storage layer and an electrode layer stacked one an another in that order, wherein the electrode layer is comprised of indium tin oxide and a photocatalyst.

11. The portable electronic device as claimed in claim 10, wherein a thickness of the electrode layer is in the approximate range from 20 nm to 500 nm.

12. The portable electronic device as claimed in claim 10, wherein the photocatalyst is comprised of nano-TiO$_2$.

13. The portable electronic device as claimed in claim 12, wherein the percent by weight of TiO$_2$ in the electrode layer is in the approximate range of 1% to 20%.

14. The portable electronic device as claimed in claim 12, wherein the nano-$TiO_2$ is in the form of particles, and a grain size of the particles $TiO_2$ is in the approximate range from 10 nm to 20 nm.

15. A portable electronic device, comprising:
a casing including a shell and a multilayer structure formed on the shell, wherein the multilayer structure comprises an electrically conductive layer, an electrochromic layer, an electrolyte layer, an ion storage layer and a electrode layer stacked one on another in that order, wherein the multilayer structure farther comprises a fluorescent layer comprised of indium tin oxide and fluorescent particles formed on the electrode layer.

16. The portable electronic device as claimed in claim 15, wherein a material of the fluorescent particles is selected from the group consisting of $ZnSiO_m$:Eu, (Y, Gd)$BO_3$:Eu, and Ba:MgAl$O_n$:Eu, and a percent by weight of the fluorescent particles in the fluorescent layer is in the approximate range from 0.1% to 2%, wherein m is in the range from 0.5 to 3 and n is in the range from 1 to 2.

* * * * *